United States Patent
Lee

(10) Patent No.: US 10,990,469 B2
(45) Date of Patent: Apr. 27, 2021

(54) MAINTENANCE METHODS OF DIGITAL SIGNAGE AND TROUBLESHOOTING AND WARNING METHODS, DIGITAL SIGNAGE PLAYING SYSTEMS AND PLAYERS THEREOF

(71) Applicant: Acer Incorporated, New Taipei (TW)

(72) Inventor: Chun-Hua Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 175 days.

(21) Appl. No.: 16/198,998

(22) Filed: Nov. 23, 2018

(65) Prior Publication Data
US 2019/0164576 A1  May 30, 2019

(30) Foreign Application Priority Data
Nov. 28, 2017  (TW) ................ 106141348

(51) Int. Cl.
*G06F 11/07* (2006.01)
*G06F 11/14* (2006.01)
*G06F 11/22* (2006.01)

(52) U.S. Cl.
CPC ........ *G06F 11/0793* (2013.01); *G06F 11/079* (2013.01); *G06F 11/1438* (2013.01); *G06F 11/2221* (2013.01); *G06F 2201/805* (2013.01)

(58) Field of Classification Search
CPC ............... G06F 11/0793; G06F 11/079; G06F 11/1438; G06F 11/2221; G06F 2201/805; G09G 3/00; G09G 3/006
See application file for complete search history.

(56) References Cited

U.S. PATENT DOCUMENTS

| | | | |
|---|---|---|---|
| 2004/0017367 A1 | 1/2004 | Kim | |
| 2010/0118200 A1* | 5/2010 | Gelman | H04N 21/41415 348/578 |

FOREIGN PATENT DOCUMENTS

| | | |
|---|---|---|
| CN | 202916715 U | 5/2013 |
| CN | 103606348 A | 2/2014 |

(Continued)

OTHER PUBLICATIONS

T. Heikkinen, T. Linden, T. Ojala, H. Kukka, M. Jurmu, and S. Hosio; "Lessons Learned from the Deployment and Maintenance of UBI-hotspots;" in Multimedia and Ubiquitous Engineering (MUE), 2010 4th International Conference; Aug. 2010; pp. 1-6.*

(Continued)

*Primary Examiner* — Joseph R Kudirka
(74) *Attorney, Agent, or Firm* — McClure, Qualey & Rodack, LLP

(57) ABSTRACT

Maintenance methods of digital signage applied to a player of the digital signage are provided, wherein the player performs playback software to play multimedia information through the digital signage. The method includes the steps of: detecting processor usage statuses of one or more processes corresponding to the playback software; determining whether a predetermined condition is satisfied based on the processor usage statuses of the one or more processes; activating a screen analysis module to detect whether a screen image is abnormal in response to determining that the predetermined condition is satisfied; and activating a troubleshooting module to automatically perform an automatic troubleshooting procedure in response to the screen detection module detecting that the screen image is abnormal.

15 Claims, 6 Drawing Sheets

(56) References Cited

FOREIGN PATENT DOCUMENTS

| CN | 106686422 A | 5/2017 |
|---|---|---|
| TW | 201432978 A | 8/2014 |

OTHER PUBLICATIONS

Chinese language office action dated Apr. 13, 2018, issued in application No. TW 106141348.

* cited by examiner

100

100

MAINTENANCE METHODS OF DIGITAL SIGNAGE AND TROUBLESHOOTING AND WARNING METHODS, DIGITAL SIGNAGE PLAYING SYSTEMS AND PLAYERS THEREOF

CROSS REFERENCE TO RELATED APPLICATIONS

This application claims priority of Taiwan Application No. 106141348, filed on Nov. 28, 2017, the entirety of which is incorporated by reference herein.

FIELD OF THE INVENTION

The invention relates to digital signage processing technology, and more particularly, to methods for monitoring whether playing of a digital signage is abnormal and methods for performing quick troubleshooting and warning thereof with limited hardware resources.

DESCRIPTION OF THE RELATED ART

In recent years, with the rapid progress of science and technology and network, digital signage, also known as electronic billboards, multimedia billboards, electronic advertising billboards, etc., are widely used in enterprises, schools, art galleries, retail stores, restaurants, government agencies and other industries to provide a multimedia or interactive communication platform that can quickly deliver effective information to target customers or audiences in various business applications. A digital electronic signage (hereinafter referred to as the digital signage) usually includes a player and a screen. Users can store the pre-designed multimedia information in the player and then use the player to output the multimedia information to the screen, to provide the target customers or audiences for viewing, so as to achieve the purpose of transmitting messages to the target customers or audiences.

However, due to cost considerations, the player of the digital signage may only have limited computing power and memory size, with the player having a viewer image analysis function, such that there may only have less computing power available. In such case, redundant operations may possibly affect not only the smooth playback of multimedia videos, but also lack of software stability, thereby causing the advertising content to stop playing. Therefore, one may often see many digital signage suddenly stop their playing, making the pedestrian passed thereby can only see a black screen. Generally, in order to determine whether the digital signage is functioning correctly or it fails and needs a troubleshoot, it has traditionally been necessary to dispatch personnel on a regular basis or to the digital signage site for on-site inspection at the time of receipt of a client's notice or customer complaint, so that it is costly and inefficient, and also inability to troubleshoot and alert quickly.

Therefore, there is a need for a method capable of monitoring whether playing of a digital signage is abnormal and performing quick troubleshooting and warning thereof when needed with limited hardware resources.

BRIEF SUMMARY OF THE INVENTION

Maintenance methods of digital signage and troubleshooting and warning methods, digital signage playing systems and players thereof are provided.

An embodiment of the invention provides a maintenance method of digital signage applied to a player of the digital signage, wherein the player performs playback software to play multimedia information through the digital signage. The maintenance method comprises the steps of: detecting processor usage statuses of one or more processes corresponding to the playback software; determining whether a predetermined condition is satisfied based on the processor usage statuses of the one or more processes; activating a screen analysis module to detect whether a screen image is abnormal in response to determining that the predetermined condition is satisfied; and activating a troubleshooting module to automatically perform an automatic troubleshooting procedure in response to the screen detection module detecting that the screen image is abnormal.

Another embodiment of the invention provides a troubleshooting and warning method of digital signage applied to a digital signage. The troubleshooting and warning method comprises the steps of: performing a sampling operation on a screen image of the digital signage to obtain a plurality of sampled pixels according to a sampling rate; determining whether the sampled pixels are all black pixels; and in response to determining that all of the sampled pixels are black pixels, determining that the screen image is abnormal and automatically restarting playback software used for playing the screen image to replay the screen image.

Another embodiment of the invention provides a digital signage playback system with a digital signage and a player. The digital signage is configured to play multimedia information. The player which is electrically connected to the digital signage is configured to provide the multimedia information for playing on the digital signage, wherein the player is configured to detect processor usage statuses of one or more processes in a processing list corresponding to playback software, determine whether a predetermined condition is satisfied based on the processor usage statuses of the one or more processes, and in response to determining that the predetermined condition is satisfied, activate a screen analysis module to detect whether a screen image is abnormal and activate a troubleshooting module to automatically perform an automatic troubleshooting procedure in response to the screen detection module detecting that the screen image is abnormal.

Another embodiment of the invention provides a player with a storage device and a processor. The player is electrically connected to a digital signage. The storage device stores multimedia information. The processor which is coupled to the storage device is configured to provide the multimedia information to be played on the digital signage; wherein the processor is configured to activate a monitoring module for detecting processor usage statuses of one or more processes in a processing list corresponding to playback software, determine whether a predetermined condition is satisfied based on the processor usage statuses of the one or more processes, and in response to determining that the predetermined condition is satisfied, activate a screen analysis module to detect whether a screen image is abnormal and activate a troubleshooting module to automatically perform an automatic troubleshooting procedure in response to the screen detection module detecting that the screen image is abnormal.

Methods may be practiced by the disclosed devices or systems which are suitable firmware or hardware components capable of performing specific functions. Methods may also take the form of a program code embodied in a tangible media. When the program code is loaded into and executed by an electronic device, a processor, a computer or a machine, the electronic device, the processor, the computer or the machine becomes an apparatus for practicing the disclosed method. Other aspects and features of the present invention will become apparent to those with ordinary skill in the art upon review of the following descriptions of specific embodiments of the mobile devices for carrying out the maintenance methods of digital signage and troubleshooting and warning methods thereof.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the invention provide maintenance methods of digital signage and troubleshooting and warning methods thereof, which can monitor processes used when the playback software plays contents, and when a specific behavior for the monitored processes is detected, a screen detection operation for the current screen can be performed and an abnormality notification can be sent by an abnormality reporting module and then an automatic troubleshooting procedure can be performed after the abnormality notification has been sent when a black screen has been detected and results for performing the automatic troubleshooting procedure can then be reported. Accordingly, the occurrence of the fault condition can be immediately detected in real time, which can achieve a goal for instant notice of the failure and automatically perform a troubleshooting procedure for troubleshooting and report the results for the troubleshooting procedure when a fault is detected, so that failure can be immediately and automatically excluded or be quickly repaired after notification, thus efficiently reducing manpower and improving the efficiency of digital signage monitoring.

Figure 1:
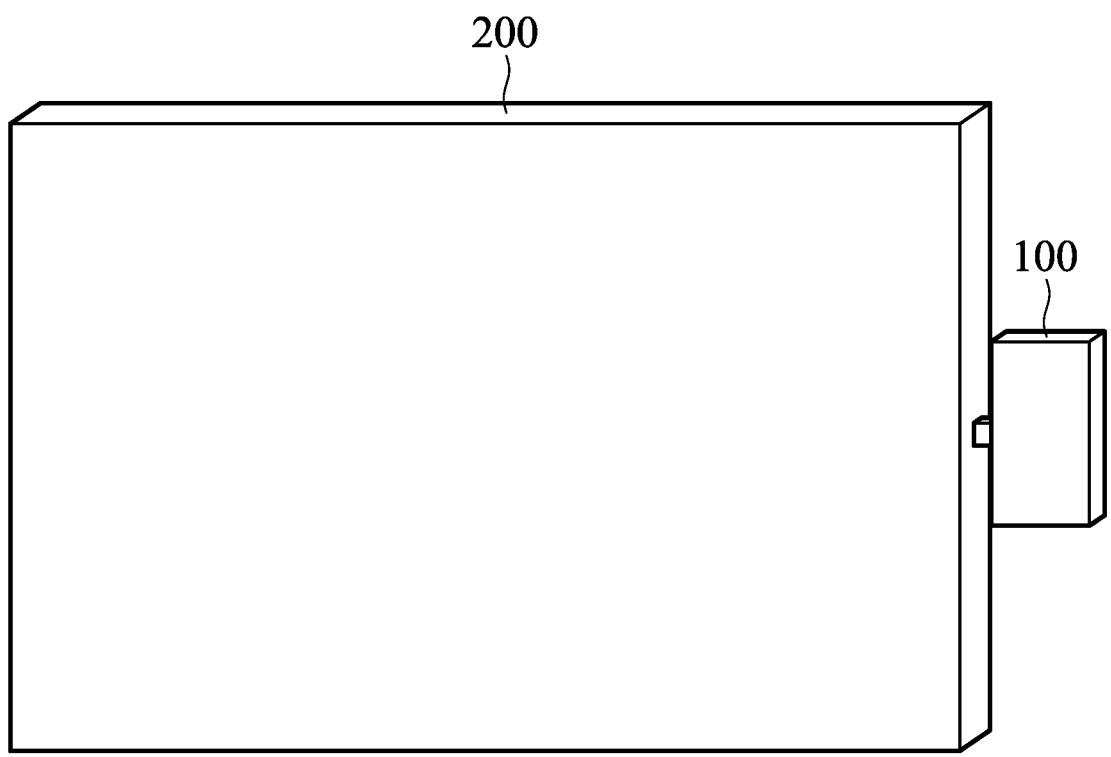
FIG. 1 is a schematic diagram of a digital signage playback system according to an embodiment of the invention.
Figure 2:
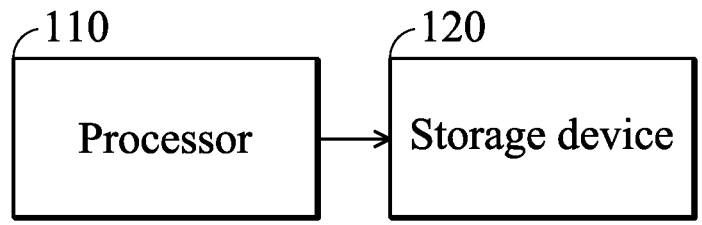
FIG. 2 is a schematic diagram of a hardware structure of the player according to an embodiment of the invention.

FIG. 1 is a schematic diagram of a digital signage playback system according to an embodiment of the invention. As shown in FIG. 1, the digital signage playing system 10 may comprise a player 100 and a digital signage 200. The player 100 is electrically connected to the digital signage 200 for providing multimedia information to the digital signage 200 to enable the digital signage 200 to play the multimedia information. For example, the multimedia information may be an advertisement content to be played, and the player 100 may provide the advertisement content to the digital signage 200 to enable the digital signage 200 to play the advertisement content. In some embodiments, the digital signage playing system 10 can be, for example, a digital electronic billboard, an electronic billboard, a multimedia signage, an electronic advertisement billboard and the like, and the invention is not limited thereto. The digital signage playing system 10 is widely used in various industries, such as enterprises, schools, art galleries, retail stores, restaurants, government agencies, to provide a multimedia or interactive communication platform that can quickly transmit valid information to target customers or audiences of various commercial applications. Please refer to FIG. 2. FIG. 2 is a schematic diagram of a hardware structure of the player 100 according to an embodiment. As shown in FIG. 2, the player 100 may further comprise a processor 110 and a storage device 120. The processor 110 may be one or more data processors, image processors and/or Central Processing Unit (CPUs), which are capable of executing one or more types of computer readable medium stored in the storage device 120 such as a memory. The storage device 120 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as screen data, intermediate data generated during the calculation process and the execution result information and so on. The application codes (not shown) stored in the storage device 120 are executed by the processor 110 to perform the maintenance methods of digital signage and troubleshooting and warning methods thereof of the present invention.

The digital signage 200 may be configured to present a screen of multimedia information, such as a Liquid-Crystal Display (LCD). It should be understood that, in some embodiments, the digital signage 200 may be a screen integrated with a touch-sensitive device (not shown). The touch-sensitive device has a touch-sensitive surface comprising sensors in at least one dimension to detect contact and movement of at least one input tool, such as a pen/stylus or finger near or on the touch-sensitive surface. Accordingly, users are able to input commands or signals via the digital signage 200. The processor 110 which is coupled to the storage device 120 can perform the maintenance methods of digital signage and troubleshooting and warning methods thereof of the present invention, which will be discussed further in the following paragraphs.

In one embodiment, the processor 110 may be a microprocessor which is capable of executing one or more types of computer readable medium stored in the storage device 120 such as a memory. For example, the storage device 120 may store program codes of operating systems such as Linux operating system, Windows operating system or other similar operating system and program codes of the playback software, and the program codes of operating systems and the playback software stored in the storage device 120 can be loaded and executed by the processor 110 to run the operating systems and related playback software. Although they are not shown, the digital signage playing system 10 may further comprise other functional units, such as an Input/Output (I/O) device (e.g., physical button, keyboard, mouse, etc.), a communication device or the like, and the invention is not limited thereto.

Figure 3:
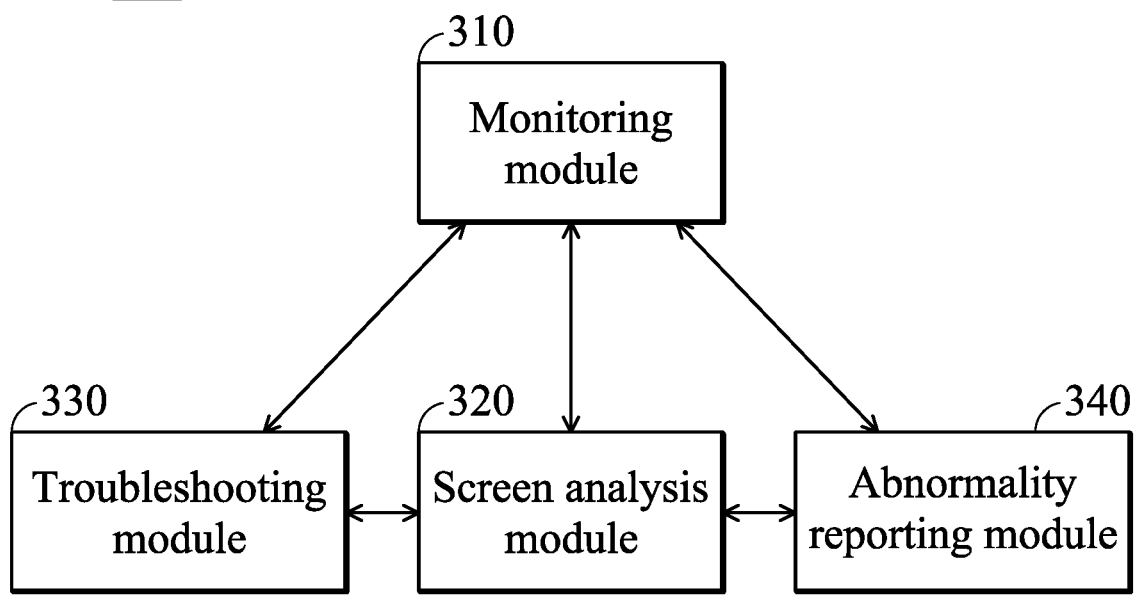
FIG. 3 is a schematic diagram of a software structure of the player according to an embodiment of the invention.

FIG. 3 is a schematic diagram of a software structure of the player 100 according to an embodiment. The software architecture of the player 100 includes a monitoring module 310, a screen analysis module 320, a troubleshooting module 330, and an abnormality reporting module 340. The monitoring module 310, the screen analysis module 320, the troubleshooting module 330 and the abnormality reporting module 340 can be stored in the storage device 120 (e.g., memory) of the player 100 and can be loaded and executed at an appropriate timing by the processor 110 of the player 100 to perform the maintenance methods of digital signage and troubleshooting and warning methods thereof of the present invention, which will be discussed further in the following paragraphs.

More particularly, the processor 110 may perform the maintenance methods of digital signage and troubleshooting and warning methods thereof of the present invention by controlling the operation of the monitoring module 310, the screen analysis module 320, the troubleshooting module 330 and the abnormality reporting module 340 to detect whether a screen under test is abnormal and perform abnormality reporting and automatic troubleshooting on the screen after the screen is detected as abnormal.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

Figure 4:
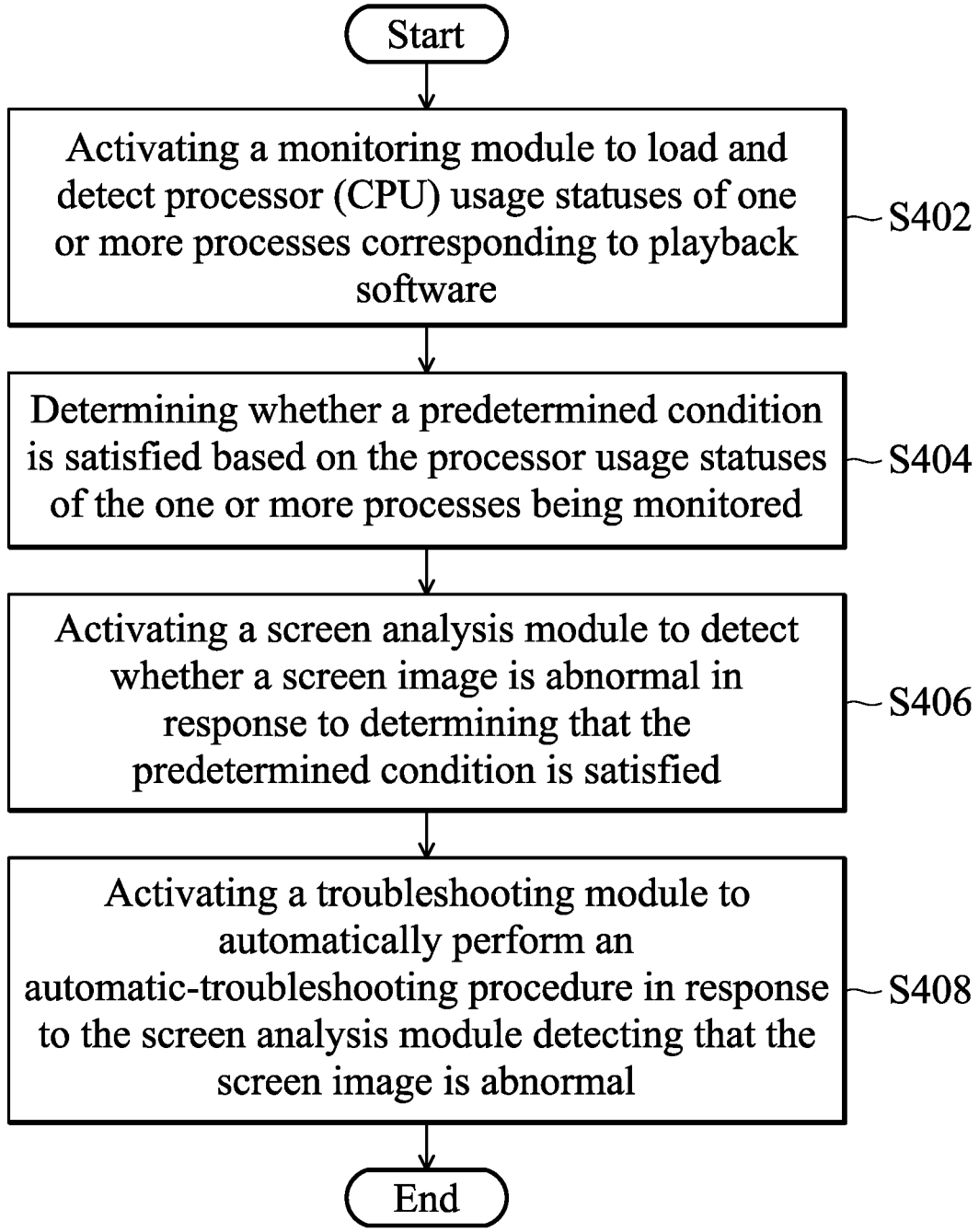
FIG. 4 is a flowchart of an embodiment of a maintenance method of digital signage of the invention.

FIG. 4 is a flowchart of an embodiment of a maintenance method of digital signage of the invention. The maintenance method of digital signage of the invention can be applied to the digital signage playing system 10 as shown in FIG. 1. For example, the method can be performed by the processor 110 of the player 100 as shown in FIG. 1.

First, in step S402, the monitoring module 310 is activated to load and detect processor (e.g., CPU) usage statuses of one or more processes corresponding to a playback software via the monitoring process of the monitoring module. Specifically, each of the playback software may have a processing list containing one or more corresponding processes used by the playback software for playing, and the processing lists may be stored in the storage device 120 in advance. Therefore, the monitoring module 310 may know which processes should be monitored subsequently based on the processing list of the playback software used by a playback operation. In this embodiment, the monitoring module 310 detects the CPU usages of all the processes in the processing list once every first time period (for example, 30 seconds).

Next, in step S404, the monitoring module 310 determines whether a predetermined condition is satisfied according to the CPU usage statuses of the processes being monitored. In one embodiment, the monitoring module 310 determines whether the predetermined condition is satisfied according to the CPU usage status of the CPU usage statuses of the processes being monitored by determining whether the CPU usage rates of all the monitored processes are zero. When all the CPU usage rates of the monitored processes are zero, it is determined that the predetermined condition is satisfied, and when any of the CPU usage rates of the monitored processes is not zero, it is determined that the predetermined condition is not satisfied. In another embodiment, the monitoring module 310 determines whether the predetermined condition is satisfied according to the CPU usage status of the CPU usage statuses of the monitored processes by determining whether the number of times for which the CPU usage rates of all the monitored processes are zero has exceeded a predetermined number of times, and determines that the predetermined condition is satisfied when the number of times for which the CPU usage rates of all the monitored processes are zero has exceeded the predetermined number of times, and determines that the predetermined condition is not satisfied when the number of times for which the CPU usage rates of all the monitored processes are zero has exceeded the predetermined number of times.

To be more specific, when there is an abnormality in the playback software of the player 100, the multimedia information, such as the advertisement contents, originally played by the digital signage 200 may stop the playing and generate a black screen. At this moment, the CPU usage rate of each of the processes used by the playback software for the playing becomes zero. According to the detection mechanism in this embodiment of the present invention, the operations of reading data of the current screen from the storage device 120 and then performing the sampling and matching of the screen to the current screen to detect the current screen will not be started until the predetermined condition is satisfied, thus eliminating the need for a large amount of unnecessary access to memory data and drastically reducing the frequency and time of data access, so as to effectively detect whether the screen image is abnormal and improve the monitoring efficiency.

In response to determining that the predetermined condition is satisfied, in step S406, the screen analysis module 320 is activated to detect whether a screen image is abnormal. Specifically, detection of whether the screen image is abnormal may be performed by detecting whether the current screen image is a black screen. As each pixel in the black screen is a black pixel, the screen analysis module 320 may determine whether the screen image is abnormal by checking whether each pixel of the current screen is a black pixel.

In some embodiments, the monitoring module 310 may periodically monitor the CPU usage statuses of the processes by using a first time period, and then continue to monitor the CPU usage statuses of the processes by using a second time period to determine whether the predetermined condition is repeatedly satisfied when determining that the predetermined condition is satisfied, wherein the second time period is shorter than the first time period. For example, the monitoring module 310 may first monitor the CPU usage status of each related process and determine whether all the CPU usage rates of the processes are zero at a frequency of detecting once every 30 seconds. When any of the CPU usage rates of the monitored processes is detected as not zero, it continues to monitor the CPU usage rates of each monitored process and determine whether all the CPU usage rates of the processes are zero at the frequency of detecting once every 30 seconds. When all of the CPU usage statuses of the monitored processes are detected as zero, the monitoring module 310 may change to monitor the number of occurrences for which the CPU usage rates of all the monitored processes are zero at a frequency of detecting once every 10 seconds, and thus the detection time required for the monitoring module 310 can be drastically shortened. In one embodiment, the monitoring module 310 may further determine the number of times for which the predetermined condition is detected as satisfied. The monitoring module 310 may detect whether the screen image is abnormal via the screen analysis module 320 only when the number of times for which the predetermined condition is detected as satisfied continuously has exceed a predetermined number of times, to avoid misjudgment. For example, the monitoring module 310 can start subsequent detection of whether the screen image is abnormal only when continuously detecting that an event that the CPU usage rates of all the processes are zero have occurred three or more times within 30 seconds.

In response to the screen analysis module 320 detecting that the screen image is abnormal, in step S408, the troubleshooting module 330 is activated to perform an automatic-troubleshooting procedure. In one embodiment, performing the automatic-troubleshooting procedure is to automatically restart the playback software, but the invention is not limited thereto. When the playback software is restarted, the multimedia information will be replayed on the digital signage again, so that the content that has stopped playing can be played back quickly. In one embodiment, in response to the screen analysis module 320 detecting that the screen image is abnormal (i.e., a black screen), the abnormality reporting module 340 is activated to generate an abnormal record associated with the abnormal time point and transmit a message indicating that the screen image is abnormal to a remote device (not shown) through a network (not shown). In this embodiment, the player 100 may be coupled to a remote device via a connected communication network (for example, any wired or wireless communication network such as Internet, 3G network and/or wireless local area network (WLAN), etc.). The player 100 may further communicate with the remote device via the connected communication network. In some embodiments, the abnormality reporting module 340 may further detect whether the screen image returns to normal after the troubleshooting module 330 automatically restarts the playback software. If the screen image returns to normal after the playback software is restarted, the fault is removed. Conversely, if the number of times that the screen image has not been recovered normally has exceeded a predetermined number of times, the abnormality reporting module 340 may send a message indicating that the screen image is abnormal and the automatic-troubleshooting procedure is failed to the remote device through the network. For example, when the screen analysis module 320 detects that the screen image is abnormal, the abnormality reporting module 340 automatically generates an abnormal record to record the start and end time of each abnormal time point at which the screen image is abnormal and transmits a message indicating that the screen image is abnormal to the remote device, such as the server, to report that the screen image is abnormal so as to notify the fault occurrence. The processor 110 may determine whether the screen image can be normally played after the software is restarted. If three or more consecutive screen abnormalities occur within 15 minutes, it means that the abnormality can't be automatically excluded, and then the abnormality reporting module 340 may report by sending a message indicating that the screen image is abnormal and the automatic-troubleshooting procedure is failed to the remote device. When the remote device receives this message indicating that the screen image is abnormal and the automatic-troubleshooting procedure is failed, it indicates that there may be some failure causes that cannot be automatically fixed occur on the digital signage. At this time, the dispatcher may then dispatch personnel to the site at which the digital signage located to perform on-site checking and troubleshooting.

In some embodiments, in order to further reduce the time required for screen detecting, the screen analysis module 320 may perform a sampling operation on pixels of the screen according to a preset sampling rate during detecting the screen, and then determine whether the screen image is abnormal by checking whether the sampled pixels are the black pixels. In one embodiment, the step of the screen analysis module 320 detecting whether the screen is abnormal may further comprise the steps of: performing a sampling operation on the current screen image according to a sampling rate to obtain a plurality of sampled pixels in the current screen image, determining whether all the sampled pixels are black pixels, and automatically performing the aforementioned automatic-troubleshooting procedure when determining that the detected screen image is abnormal.

Figure 5:
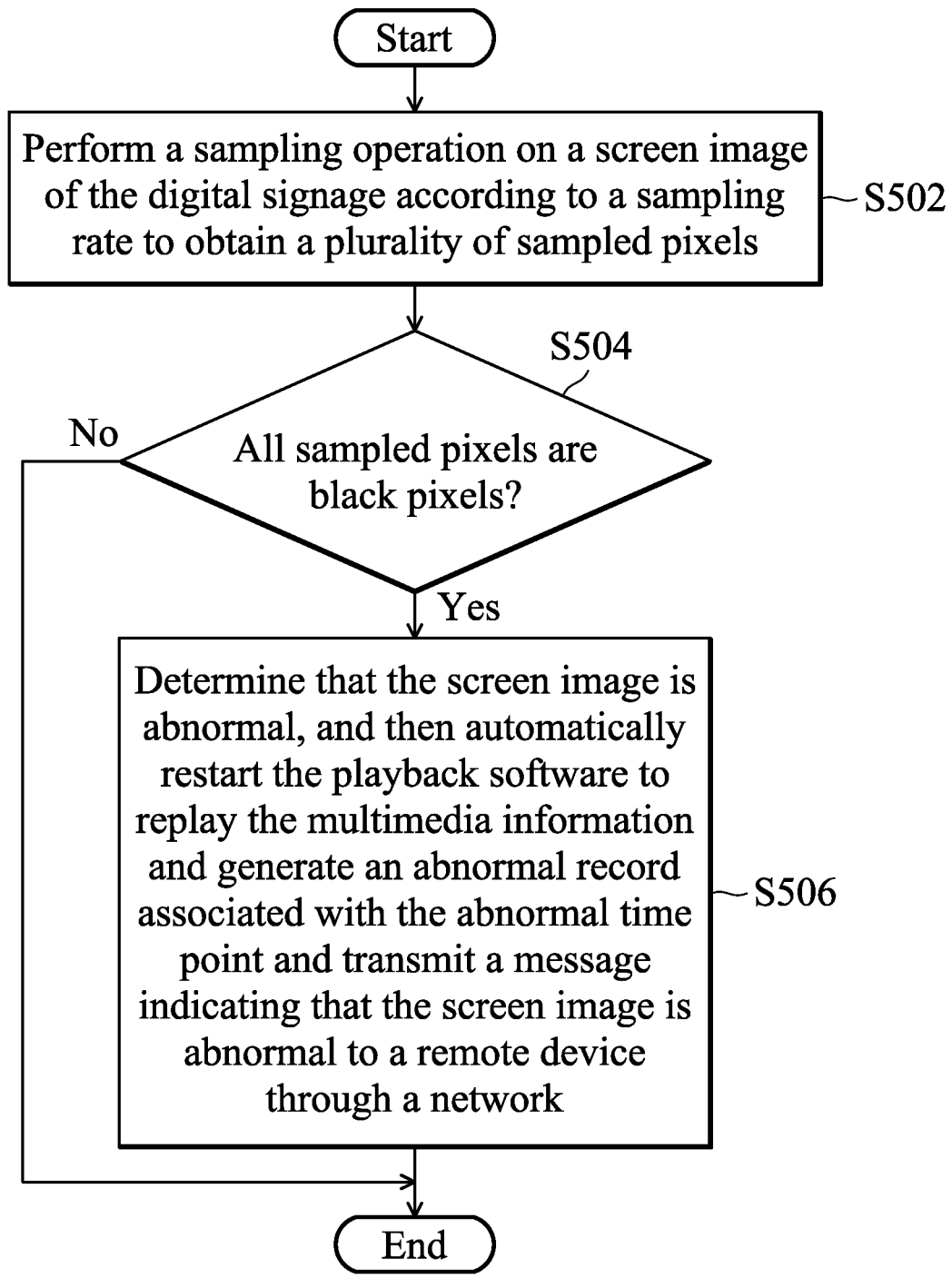
FIG. 5 is a flowchart of an embodiment of troubleshooting and warning method of digital signage of the invention.

FIG. 5 is a flowchart of an embodiment of troubleshooting and warning method of digital signage of the invention. The troubleshooting and warning method of digital signage of the invention can be applied to the digital signage playing system 10 as shown in FIG. 1. For example, the method can be performed by the processor 110 of the player 100 as shown in FIG. 1.

When the processor 110 is ready for screen image detection, in step S502, it performs a sampling operation on a screen image of the digital signage according to a sampling rate to obtain a plurality of sampled pixels. For example, the sampling rate may be set as a frequency of sampling once every ten pixels, but the invention is not limited thereto.

Next, in step S504, the processor 110 determines whether all the sampled pixels are black pixels. As described above, since each pixel in the black screen is a black pixel, the processor 110 may determine whether the screen image is abnormal by checking whether the sampled pixels of the current screen image are black pixels through the screen analysis module 320. When all the sampled pixels are black pixels, it indicates that the current screen image may be a black screen, and the detected screen image is determined as abnormal. When any of the sampled pixels is not a black pixel, the screen image is determined as normal.

When all the sampled pixels are black pixels, in step S506, the processor 110 determines that the screen image is abnormal and then automatically restarts the playback software to replay the multimedia information and generates an abnormal record associated with the abnormal time point and transmit a message indicating that the screen image is abnormal to a remote device through a network. Specifically, in response to the screen analysis module 320 detecting that the screen image is abnormal (i.e., a black screen), the abnormality reporting module 340 is activated to generate an abnormal record associated with the abnormal time point and transmit a message indicating that the screen image is abnormal to a remote device through a network. In some embodiments, the abnormality reporting module 340 may further detect whether the screen image returns to normal after the troubleshooting module 330 automatically restarts the playback software. If the screen image returns to normal after the playback software is restarted, the fault is removed. Conversely, if the number of times that the screen image has not been recovered normally has exceeded a predetermined number of times, the abnormality reporting module 340 may send a message indicating that the screen image is abnormal and the automatic-troubleshooting procedure is failed to the remote device through the network.

For explanation, some specific embodiments are illustrated in the following to help illustrate the practical application details of the maintenance methods of digital signage and troubleshooting and warning methods thereof of the present invention, and those skilled in the art will understand that these specific embodiments are used for explanation only and the invention is not limited thereto.

Figure 6A:
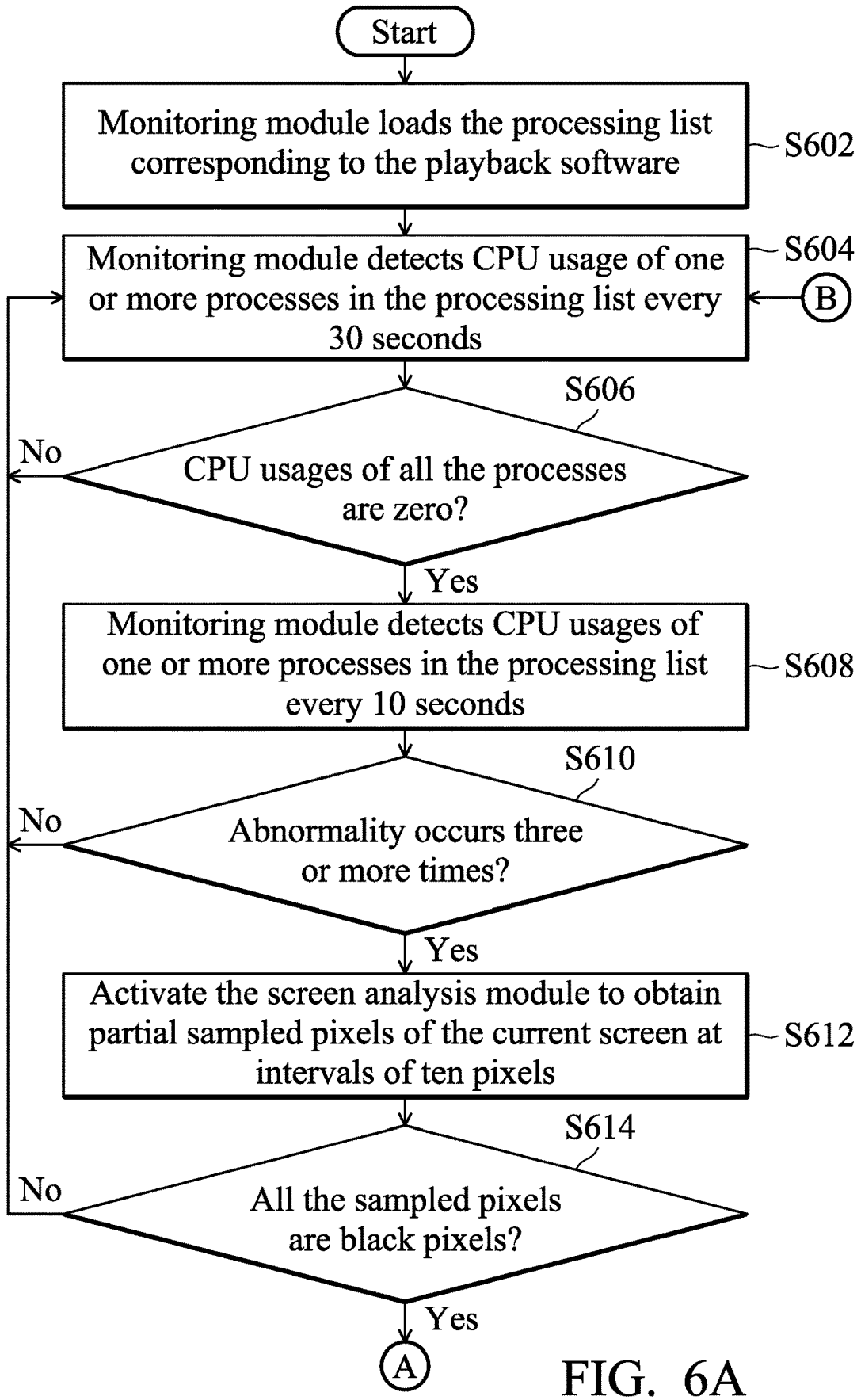
FIGS. 6A and 6B show a flowchart of another embodiment of a signal detection method of digital signage and troubleshooting and warning methods thereof of the invention.
Figure 6B:
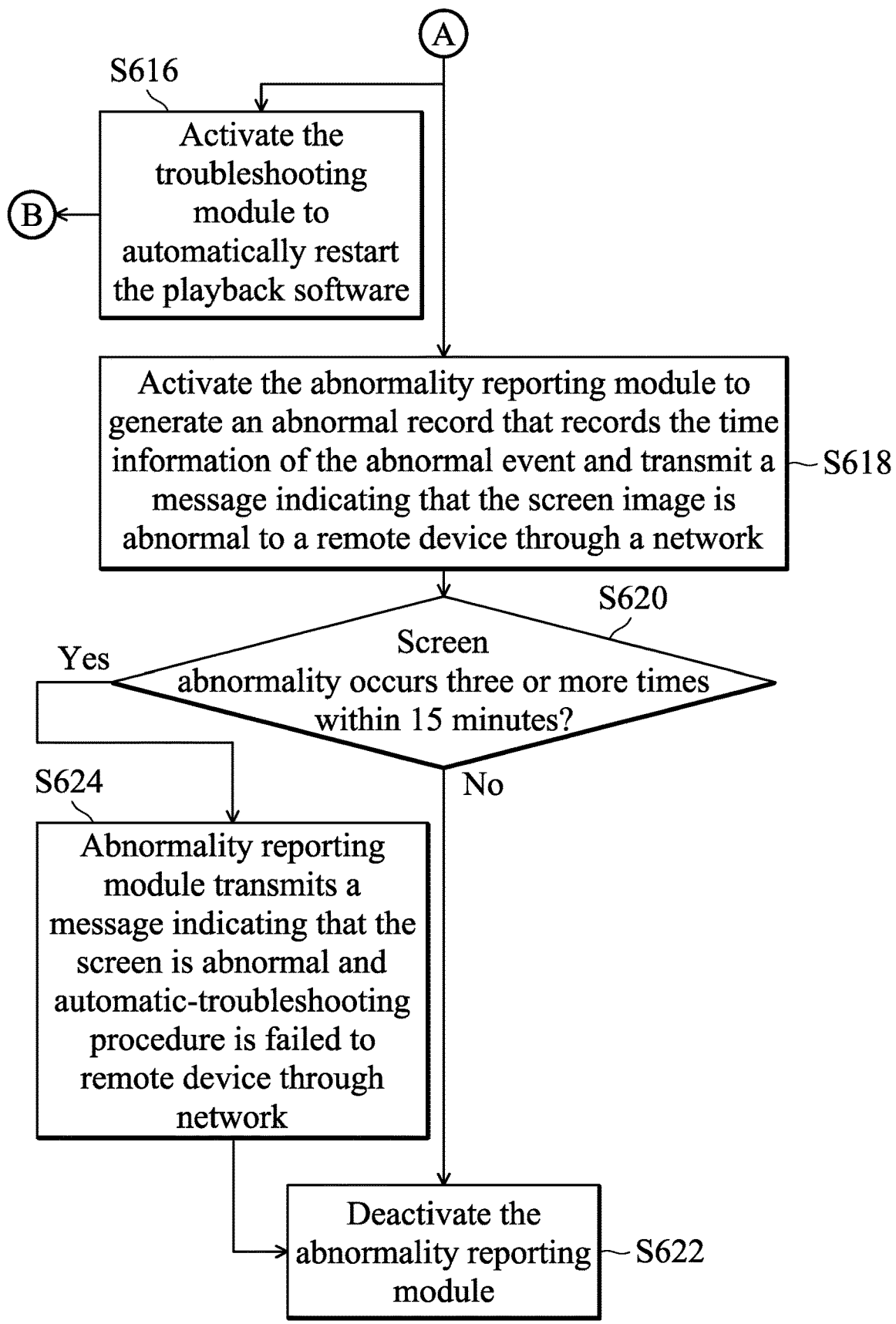

FIGS. 6A and 6B show a flowchart of another embodiment of a signal detection method of digital signage and troubleshooting and warning methods thereof of the present invention. The signal detection method of digital signage and troubleshooting and warning methods thereof of the invention can be applied to the player 100 as shown in FIG. 1. For example, the method can be performed by the processor 110 of the player 100 as shown in FIG. 1. In this embodiment, the processor 110 may perform the signal detection method of digital signage and troubleshooting and warning methods thereof of the present invention by controlling the operation of the monitoring module, the screen analysis module, the troubleshooting module and the abnormality reporting module to detect whether a screen under test is abnormal and perform automatic troubleshooting on the screen after the screen is detected as abnormal.

First, the monitoring process of the monitoring module loads the processing list corresponding to the playback software (step S602) and detects CPU usages of one or more processes in the processing list every 30 seconds (step S604). For example, in one embodiment, the playback software can be a media player "Window media player", and the corresponding process can be "wmp.exe", but the invention is not limited thereto. Then, the monitoring module determines whether the CPU usages of all the monitored processes are zero, so as to determine whether a predetermined condition is satisfied (step S606). In this embodiment, the predetermined condition is determined as satisfied when the CPU usages of all the processes are zero, and the predetermined condition is determined as not satisfied when the CPU usage of any of the processes is not zero.

When any of the CPU usage of the monitored processes is not zero (No in step S606), it indicates that the playback software is operating normally, and the predetermined condition is determined as not satisfied, and the flow returns to step S604, such that the monitoring module continues to detect the CPU usages of one or more processes in the processing list and determine whether the predetermined condition is satisfied every 30 seconds.

When the CPU usages of all the monitored processes are zero (Yes in step S606), it indicates that the operating of the playback software may be abnormal and the predetermined condition is determined as satisfied, then, the monitoring process of the monitoring module shortens the detection time period to 10 seconds to detect the CPU usages of all the monitored processes in the processing list once every 10 seconds (step S608) and determine whether the abnormality occurs three or more times consecutively (step S610). Specifically, when the predetermined condition is satisfied, the monitoring module can record that the abnormality occurs once. Therefore, it can be determined whether three or more consecutive abnormalities occur according to the number of times for which the predetermined condition is satisfied. When the monitoring module determines that the abnormality has not occurred more than three times successively (NO in step S610), it indicates that the monitoring module may be misjudged or the screen has returned to normal, and the flow returns to step S604, so that the monitoring module changes the detection frequency back to detect the CPU usage rates of the one or more processes in the processing list once and determine whether the predetermined condition is satisfied every 30 seconds.

When the monitoring module determines that abnormalities occur more than three times successively (Yes in step S610), the screen analysis module is activated to obtain partial sampled pixels of the current screen at intervals of ten pixels sampling once (Step S612), and determines whether all of the sampled pixels are black pixels to determine whether an abnormality occurs on the screen (step S614). When not all of the sampled pixels are black pixels (No in step S614), it indicates that the screen image is normal, and the flow returns to step S604, so that the monitoring module continues to detect the CPU usage rates of the one or more processes in the processing list once every 30 seconds and determine whether the predetermined condition is satisfied. When the sampled pixels are all black pixels (Yes in step S614), it indicates that the current screen image is a black screen, and the troubleshooting module is activated to automatically restart the playback software to play the multimedia information again (step S616). Then, the flow returns to step S604, so that the monitoring module continues to detect the CPU usage rates of the one or more processes in the processing list once every 30 seconds and determine whether the predetermined condition is satisfied.

On the other hand, when all the sampled pixels are black pixels, the abnormality reporting module is also activated to start the abnormality reporting operation and generate an abnormal record that records the time information of the abnormal event and transmit a message indicating that the screen image is abnormal to a remote device through a network (not shown) to report a screen abnormality (step S618). After the playback software is restarted, the monitoring module continues to detect the CPU usage rates of the one or more processes in the processing list once and determine whether the predetermined condition is satisfied every 30 seconds.

The abnormality reporting module calculates the number of times for which the screen image is abnormal, and determines whether a screen abnormality occurs three times within 15 minutes (step S620). If the screen abnormality occurs less than three times within 15 minutes (No in step S620), it means that the fault has been automatically rectified and no additional action is required, and thus the abnormality reporting module will be deactivated to end the abnormality reporting operation (step S622). If the screen abnormality occurs for more than three times within 15 minutes after restarting the playback software (Yes in step S620), it indicates that the playback software is restarted and the fault can't be rectified, and thus the abnormality reporting module transmits a message indicating that the screen image is abnormal and automatic-troubleshooting procedure is failed to the remote device through the network (step S624). Thereafter, the abnormality reporting module is deactivated to end the abnormality reporting operation (step S622). Upon receiving the message indicating that the screen is abnormal and the automatic-troubleshooting procedure is failed, the dispatcher at the remote device end may determine that the digital signage can't be rectified automatically. At this time, the dispatcher may then dispatch personnel to the site at which the digital signage located to perform on-site checking and troubleshooting. The remote device may be a server or a portable device of a specific person, such as, a portable device of an engineer whose location is nearing the location of the failed digital signage, etc. When the remote server receives the error signal, it may attempt to troubleshoot first by remote controlling or may quickly dispatch personnel to the site at which the digital signage located to perform on-site checking and troubleshooting so that the fault can be quickly eliminated and losses caused due to that the digital signage stopped the broadcast of advertising content for a long time can be avoided.

Therefore, according to the maintenance method of digital signage and troubleshooting and warning method thereof of the invention, the processes used when the playback software plays contents can be monitored, and when a specific behavior for the monitored process is detected, a screen detection operation for the current screen can be performed by the screen analysis module and an abnormality notification can be sent by the abnormality reporting module and then an automatic troubleshooting procedure can be performed by the troubleshooting module after the abnormality notification has been sent when a black screen has been detected. The results for performing the automatic troubleshooting procedure can then be reported by the abnormality reporting module. Accordingly, the occurrence of the fault condition can be immediately detected in real time, which can achieve a goal for instant notice of the failure and automatically perform the troubleshooting procedure for troubleshooting and report the results for the troubleshooting procedure when a fault is detected, so that failure can be immediately and automatically excluded or promptly repaired after notification, thus efficiently reducing manpower and improving the efficiency of digital signage monitoring.

While the invention has been described by way of example and in terms of preferred embodiment, it should be understood that the invention is not limited thereto. On the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A maintenance method of digital signage applied to a player of the digital signage, wherein the player performs playback software to play multimedia information through the digital signage, the maintenance method comprising:
   detecting processor usage statuses of one or more processes corresponding to the playback software;
   determining whether a predetermined condition is satisfied based on the processor usage statuses of the one or more processes;
   activating a screen analysis module to detect whether a screen image is abnormal in response to determining that the predetermined condition is satisfied; and
   activating a troubleshooting module to automatically perform an automatic troubleshooting procedure in response to the screen detection module detecting that the screen image is abnormal.

2. The maintenance method of claim 1, wherein determining whether the predetermined condition is satisfied based on the processor usage statuses of the one or more processes is performed by determining whether all of processor usage rates of the one or more processes are zero, and the predetermined condition is determined as being satisfied when all of the processor usage rates of the one or more processes are zero.

3. The maintenance method of claim 2, further comprising:
   determining whether a number of times detected for which the predetermined condition is satisfied has exceeded a predetermined number of times; and
   when detecting that the number of times for which the predetermined condition is satisfied has exceeded the predetermined number of times, detecting whether the screen image is abnormal via the screen analysis module.

4. The maintenance method of claim 1, wherein the step of automatically performing the automatic troubleshooting procedure further comprises:
   automatically restarting the playback software to replay the multimedia information.

5. The maintenance method of claim 1, further comprising:
   periodically detecting the processor usage statuses of the one or more processes using a first time period and continuing to determine whether the predetermined condition is continually satisfied based on the processor usage statuses of the one or more processes using a second time period when determining that the predetermined condition is satisfied,
   wherein the second time period is shorter than the first time period.

6. The maintenance method of claim 1, detecting that the screen image is abnormal comprising:
   performing a sampling operation on a screen image of the digital signage to obtain a plurality of sampled pixels according to a sampling rate;
   determining whether the sampled pixels are all black pixels; and
   in response to determining that all of the sampled pixels are black pixels, determining that the screen image is abnormal and automatically restarting playback software used for playing the screen image to replay the screen image.

7. The maintenance method of claim 6, further comprising:
   in response to determining that the screen image is abnormal, activating an abnormality reporting module to generate an abnormal record and send a message indicating that the screen image is abnormal to a remote device through a network.

8. The maintenance method of claim 7, further comprising:
   detecting whether the screen image is returned to normal after automatically restarting the playback software; and
   sending a message indicating that the screen image is abnormal and the automatic troubleshooting procedure has failed to the remote device through the network when continually detecting that the screen image has not returned to normal for more than a predetermined number of times.

9. A digital signage playback system, comprising:
   a digital signage, configured to play multimedia information; and
   a player electrically connected to the digital signage, configured to provide the multimedia information for playing on the digital signage;
   wherein the player is configured to detect processor usage statuses of one or more processes in a processing list corresponding to playback software, determine whether a predetermined condition is satisfied based on the processor usage statuses of the one or more processes, and in response to determining that the predetermined condition is satisfied, activate a screen analysis module to detect whether a screen image is abnormal and activate a troubleshooting module to automatically perform an automatic troubleshooting procedure in response to the screen detection module detecting that the screen image is abnormal.

10. The digital signage playback system of claim 9, wherein the player is further configured to determine whether the predetermined condition is satisfied based on the processor usage statuses of the one or more processes by determining whether all of processor usage rates of the one or more processes are zero, and the player determines that the predetermined condition is satisfied when all of the processor usage rates of the one or more processes are zero.

11. The digital signage playback system of claim 10, wherein the player is further configured to determine whether a number of times detected for which the predetermined condition is satisfied has exceeded a predetermined number of times, and detect whether the screen image is abnormal via the screen analysis module when detecting that the number of times for which the predetermined condition is satisfied has exceeded the predetermined number of times.

12. The digital signage playback system of claim 9, wherein the player is further configured to automatically perform the automatic troubleshooting procedure by automatically restarting the playback software to replay the multimedia information.

13. The digital signage playback system of claim 9, wherein the player is further configured to periodically detect the processor usage statuses of the one or more processes using a first time period and continue to determine whether the predetermined condition is continually satisfied based on the processor usage statuses of the one or more processes using a second time period when determining that the predetermined condition is satisfied, wherein the second time period is shorter than the first time period.

14. A player, electrically connected to a digital signage, comprising:
a storage device for storing multimedia information; and
a processor coupled to the storage device, configured to provide the multimedia information to be played on the digital signage;
wherein the processor is configured to activate a monitoring module for detecting processor usage statuses of one or more processes in a processing list corresponding to playback software, determine whether a predetermined condition is satisfied based on the processor usage statuses of the one or more processes, and in response to determining that the predetermined condition is satisfied, activate a screen analysis module to detect whether a screen image is abnormal and activate a troubleshooting module to automatically perform an automatic troubleshooting procedure in response to the screen detection module detecting that the screen image is abnormal.

15. A signal detection and troubleshooting and warning method of a digital signage, applied to a player of the digital signage, wherein the player comprises at least a monitoring module, a screen analysis module and a troubleshooting module, the method comprising:
loading and detecting processor usage statuses of one or more processes in a processing list corresponding to playback software via the monitoring module;
determining whether a predetermined condition is satisfied based on the processor usage statuses of the one or more processes;
detecting whether a screen image is abnormal via the screen analysis module in response to determining that the predetermined condition is satisfied; and
automatically performing an automatic troubleshooting procedure via the troubleshooting module in response to the screen detection module detecting that the screen image is abnormal.

\* \* \* \* \*